United States Patent [19]

Martin

[11] Patent Number: 4,600,118

[45] Date of Patent: Jul. 15, 1986

[54] FERRULE DISPENSER

[76] Inventor: Gerald D. Martin, 301 Jackson, St. Charles, Mo. 63301

[21] Appl. No.: 576,478

[22] Filed: Feb. 2, 1984

[51] Int. Cl.$^4$ ............................................. B65G 59/06
[52] U.S. Cl. ....................................... 221/1; 221/197; 221/297; 221/301; 221/312 A
[58] Field of Search ............... 221/197, 198, 289, 287, 221/297, 298, 301, 312 A, 1; 133/4 A, 5 A, 6

[56] References Cited

U.S. PATENT DOCUMENTS

| | | | |
|---|---|---|---|
| 1,800,459 | 4/1931 | Maclean | 221/312 A X |
| 2,220,354 | 11/1940 | Sheetz | 221/307 X |
| 2,520,321 | 8/1950 | McDonald et al. | 221/289 X |
| 2,901,146 | 8/1959 | Powell et al. | 221/298 X |
| 3,464,590 | 9/1969 | Giannettino | 221/297 |
| 3,998,238 | 12/1976 | Nigro | 221/279 X |
| 4,087,021 | 5/1978 | Cotugno | 221/312 A X |
| 4,119,243 | 10/1978 | Marecek et al. | 221/298 |
| 4,216,878 | 8/1980 | Naud | 133/5 A X |
| 4,239,125 | 12/1980 | Pawlowski | 221/65 |

FOREIGN PATENT DOCUMENTS

| | | | |
|---|---|---|---|
| 141639 | 5/1935 | Austria | 221/297 |
| 558778 | 7/1977 | U.S.S.R. | 221/298 |

*Primary Examiner*—F. J. Bartuska
*Attorney, Agent, or Firm*—Gravely, Lieder & Woodruff

[57] ABSTRACT

This invention relates to the dispensing of ceramic ferrules individually from a dispenser which is loaded from a disposable cartridge containing the ferrules. The dispenser has a longtitudinally slidable nose cone with different internal diameters, the smaller diameter holding a series of balls in the path of the ferrules to hold the ferrules in the dispenser, and the larger diameter allowing the weight of the dispensers to move the balls into the larger diameter to free the lowermost ferrule.

12 Claims, 5 Drawing Figures

FERRULE DISPENSER

BACKGROUND OF THE INVENTION

This invention relates to the art of dispensing cylindrical articles and particularly relates to a device and process for positioning cylindrical ferrules at predetermined locations on a relatively flat surface for subsequent securing of the ferrules to said surface.

This invention has specific applicability to the stud welding art where ceramic ferrules are positioned in predetermined locations on steel beams, etc. and studs are placed in the ferrules, welded to the beam, and the ferrules are broken away. The ferrules have a bell like skirt and an upper throat which positions the stud. The skirt acts as a dam to hold weld material around the base of the stud.

Presently, these ferrules are shipped loosely in bulk and fabricators place them one-by-one by hand at their predetermined locations on the job. This results in breakage of the ferrules and is an insufficient and expensive method of application.

The ferrules preferably are loaded in a paperboard or synthetic polymer tube or cartridge which is used to insert the ferrules into the main bore of the dispenser so that the cartridge is removed before the ferrules are released one-by-one from the operating end of the dispenser.

I have devised a system for packaging the ferrules and shipping them to the job site in prepackaged condition ready for immediate loading in packaged form into the dispenser of this invention.

The patents known to me which relate to article dispensing devices include Sheetz U.S. Pat. No. 2,220,354 which shows a nut dispenser and driver useful for attaching a motor car wheel to the axle drum. Powell Jr., et al U.S. Pat. No. 2,901,146 describes a golf tee dispenseer in which nested tees are held in place by resilient retaining means. Nigro U.S. Pat. No. 3,998,238 discloses a chip dispenser in which pressure on a stack of chips opens spring retainers and permits one chip to be dispensed. Marecek et al U.S. Pat. No. 4,119,243 discloses an article dispensing device which uses a pair of balls and a hollow to release articles from a stack. Pawloski U.S. Pat. No. 4,239,125 dispenses cups from a stack of nested cups from a collapsible sleeve when the user grasps the cup.

None of the foregoing noted patents discloses a structure which has all of the advantages of the present device.

It is a principal object of the present invention to provide an improved process for applying ferrules to base material to facilitate the attachment of shear connectors thereto by stud welding. It is another important object of this invention to provide an improved device for dispensing hollow cylindrical objects using a cylindrical magazine for shipping and loading the objects onto the dispensing device.

It is a further object to provide mechanical, electrical, pneumatic and hydraulic articulated dispensers which will deposit a generally cylincrical ferrule in predetermined locations on a surface in response to a command from the operator of the dispenser.

It is still a further object of this invention to provide a dispenser for generally cylindrical hollow objects in which the objects are loaded into a disposable magazine tube prior to being inserted into the dispenser.

It is still another object to provide an improved method of shipping and storing breakable ferrules used in the stud welding industry and to reduce the labor costs of positioning the ferrules onto a work surface using a unique applicator and loading cartridge for said applicator.

These and other objects and advantages will become apparent hereinafter.

The present invention comprises a dispenser for hollow cylindrical objects which are loaded onto the dispenser from a disposable magazine and including means for restraining the objects in the dispenser and for depositing the objects one-by-one from the working end of the dispenser in response to manual or switch operated actions of the operator.

BRIEF DESCRIPTION OF THE DRAWINGS

In the drawings where like numbers refer to like parts wherever they occur.

DETAILED DESCRIPTION

Figure 1:
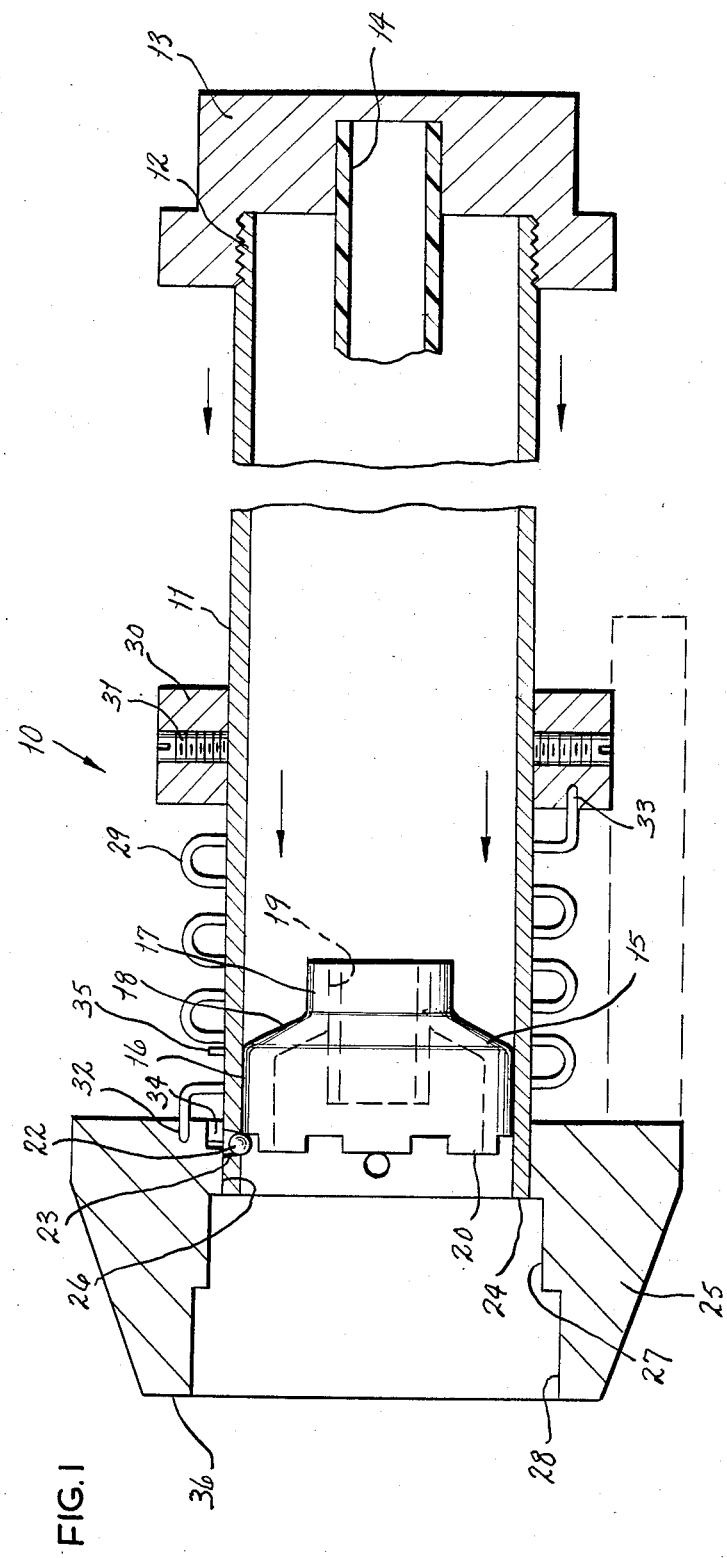
FIG. 1 is a fragmentary side view partly in section of a preferred form of the invention.

FIG. 1 shows a most preferred form of the invention as embodied in a manually operated mechanical dispenser 10 which includes a tubular body 11 which is threaded at its upper end 12 to receive a closure cap 13. The cap 13 mounts an internal stem 14 which serves to position and align the hollow cylindrical ferrules 15 which are to be dispensed from the dispenser 10.

The ferrules 15 have a bell shaped cylindrical skirt 16 and a reduced neck 17 connected by an external shoulder 18 and are provided with an internal throughbore 19 which can accommodate the stem 14. The leading edge of the ferrule is serrated at 20. These ferrules 15 are of a type made by many manufacturers including TRW-Nelson, Omark-KSM, TRUWELD, ERICO Products, etc. In use, the ferrules 15 are placed on a work surface and a shear connector is positioned in the ferrules 15 so that the neck 17 holds the shear connector in place. The space between the shear connector and the interior of the skirt 16 defines a weld dam to hold weld material around the base of the shear connector at its junction with the work surface. Other types of ferrules can be accommodated in the dispenser 10.

Figure 3:
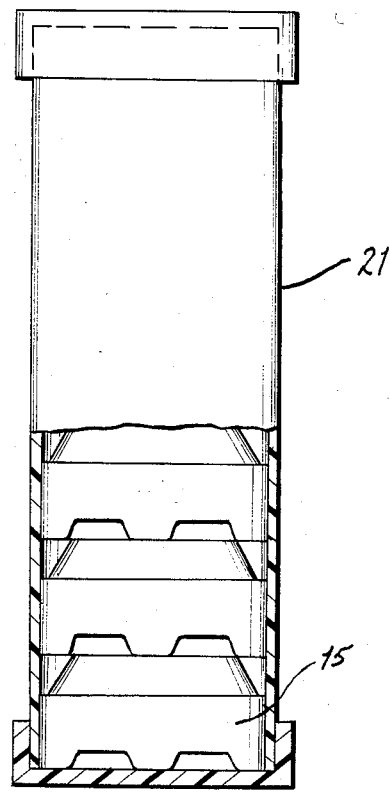
FIG. 3 is a side elevational view partly broken away of a magazine holding ferrules.
Figure 4:
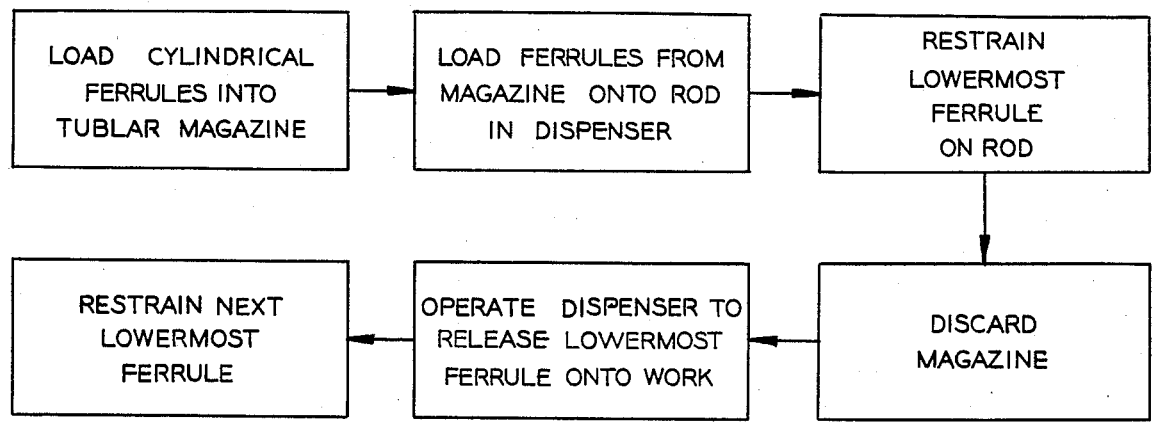
FIG. 4 is a schematic flow sheet of the improved overall process of this invention.

Presently these ferrules 15 are packaged loosely in boxes which are shipped to the job site and this results in broken ferrules and high labor costs for placement of the ferrules on the job. I package the ferrules 15 into cylindrical disposable paperboard or plastic tube or cartridge 21 (FIG. 3) to facilitate shipment, on site handling, and loading into the dispenser, as well as reducing breakage and labor costs. The tube 21 is opened and the ferrules 15 are loaded into the dispenser body 11 over the guide stem 14. The magazine 21 then is discarded.

Figure 2:
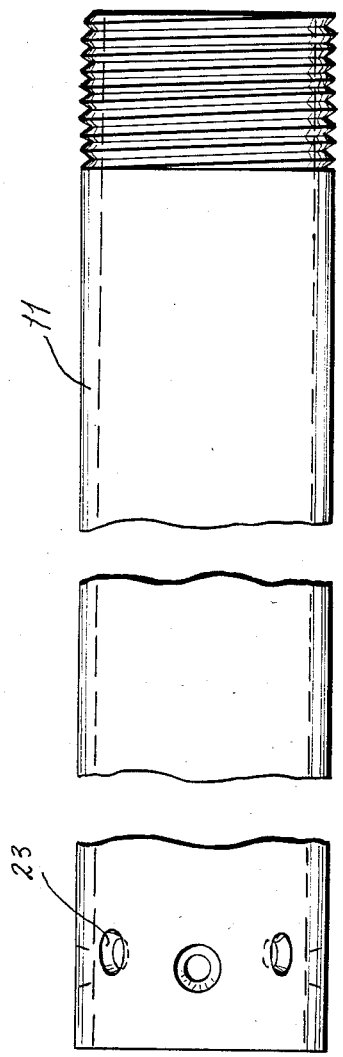
FIG. 2 is a detail side view of the dispenser body.

The restraining means includes a series of balls 22 positioned in staggered tapered openings 23 in the side wall of the body 11 near its working end 24. The openings 23 are sized so that the balls 22 will not fall into the interior of the tube 11, but can be withdrawn completely from the exterior of the tube 11. In other words, the openings 23 taper from the exterior wall to the interior wall of the tube 11 and the diameter of the tube interior wall opening is less than the diameter of the ball 22. The balls 22 can move partially into the interior of the tube 11 a sufficient distance to obstruct the passage defined thereby and thus engage the lowermost edge of the lowest ferrules 15 and restrain the stack of ferrules 15 in the tube 11. This structure is shown in FIG. 2. The openings 23 are staggered with respect to the loweredge 24 of the body 11 so that they can engage either the highest or lowest part of the ferrule serrations 20.

Holding the balls 22 in their inward or ferrule restraining position is a movable cone 25. The cone 25 has a bore 26 of a diameter to slidably fit on the working end 24 of the body 11. The adjacent counterbore 27 is of a diameter to accommodate the balls 22 and allow the balls 22 to be withdrawn from the path of the ferrule 15. A counterbore 28 of larger diameter is formed adjacent to the free end of the cone 25 and allows the lead ferrule 15 to drop freely out of the cone 25.

A spring 29 surrounds the body 11 and is interposed between the cone 25 and a placement collar 30. The collar 30 is slidable along the outer surface of the body 11 and is fixed relative to the body 11 by set screws 31. The ends 32 and 33 of the spring 29 are anchored respectively in the cone 25 and the collar 30. The spring 29 retains the cone 25 on the body 11 and returns the dispenser 10 to its loaded position after the body 11 has been forced into the cone 25 (in the direction of the arrow "A" in FIG. 1) to discharge a ferrule 15.

For loading ferrules 15 from a cartridge 21 into the body 11, the cone 25 is forced along the body toward the collar 30 and is held in loading position by means of the lock slot 34 and lock pin 35. The slot 34 is substantially L-shaped so that the pin 35 is slid into the open end of the slot and the cone 25 rotated to lock the cone 25 with respect to the body 11. The pin 35 is located such that when it is locked in the slot 34, the cone counterbore 27 is located opposite the balls 22 and accommodates the ball 22 to clear the inside of the body 11, whereby the ferrules 15 are freely loaded into the body 11. The cone 25 is rotated in an opposite direction to unlock the pin 35 from the slot 34 so that the spring 29 urges the cone 25 toward the body end 24 and the balls 22 engage the cone bore 26 and move into the path of the forwardmost ferrule 15 to retain the same in the body 11.

In operation, the loaded dispenser 10 is placed on a surface with the leading edge 36 of the cone 25 against the surface. The body 11 is urged toward the surface and moves inside the cone 25. As the body 11 moves toward the surface, the spring 29 compresses and the balls 22 move into the counterbore 27 to free the lowermost ferrule 15 which drops out of the cartridge 21 onto the surface. As force is removed from the body 11, the spring 29 expands and urges the body 11 away from the surface. As the body 11 moves through the cone 25 away from the leading end 36, the balls 22 engage the cone bore 26 and move into the body 11 to restrain the next ferrules 15.

The cone 25 is sized such that only one ferrule 15 will be deposited on the work surface at a time. When the body 11 is allowed to move away from the work surface the balls 22 engage the loweredge of the next lowermost ferrule 15 to retain the stack of ferrules 15 in the body 11.

MODIFICATION

Figure 5:
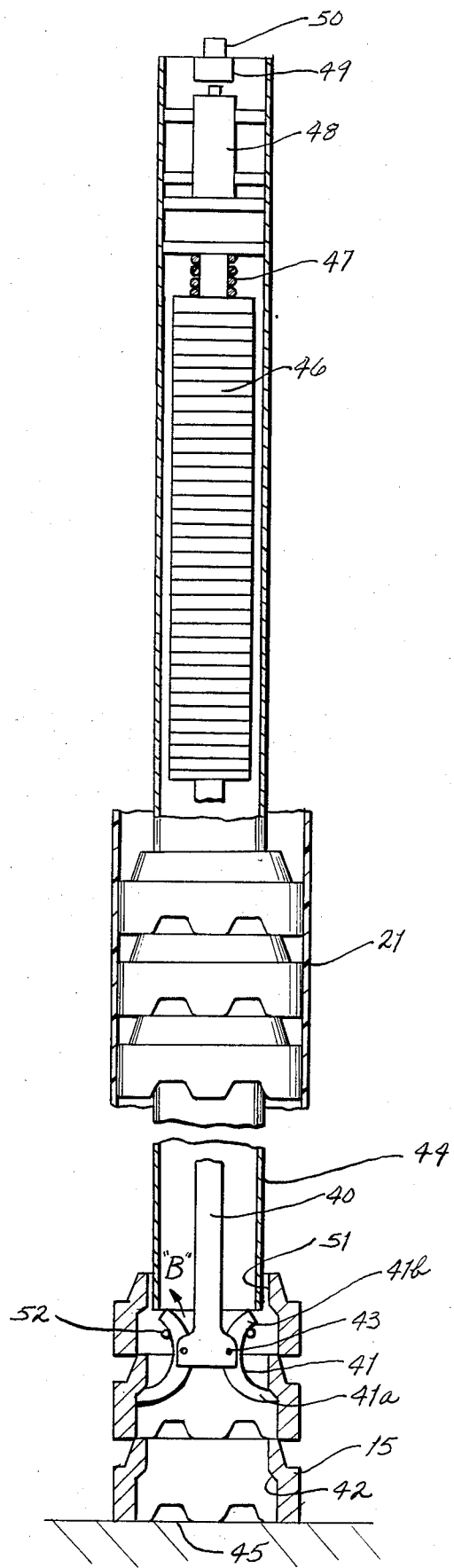
FIG. 5 is a fragmentary side view partly in section of a modification of the invention.

FIG. 5 shows a modification of the present invention and comprises a solenoid actuated rod 40 which controls a set of rocker arms 41 which engage an internal shoulder 42 on a ferrule 15. The rocker arms 41 are pivotally connected at 43 to the leading end of the rod 40. The rod 40 is centered in a tube 44, the leading end 45 of which is adapted to engage a work surface where a ferrule is to be deposited.

The rod 40 is controlled by a solenoid 46 including the usual return spring 47 and is operated by a battery 48, switch 49 and push button 50. The rod 40 can be pneumatically operated by hydraulics or a straight mechanical operation.

The ferrules 15 are slidingly positioned inside a cartridge 21 and the tube 44 is sized to fit within the bore 51 of the ferrules 15. Thus, the ferrules will fall freely from the cartridge 21 unless restrained by the arms 41. A return spring 52 is positioned around the rocker arm 41 and urges the lower arm segment 41a away from the rod 40 when the rocker arm 41 is in ferrule engaging position (FIG. 1).

OPERATION

In operation of the device of FIG. 5 a cartridge 21 containing a stack of ferrules 15 is slipped over the tube 44 and the rocker arm segment 41a is moved into engagement with the internal shoulder 42 of the lowermost ferrule 15 of the stack. This holds the ferrules 15 in the cartridge 21 when the cartridge is removed.

When the solenoid 46 is actuated through the button 50 and switch 49, the rod 40 is moved upwardly away from the work surface and the spring 47 is compressed. The rocker arm 41 is pivoted in the direction of the arrow "B" in FIG. 5 and the arm segment 41a moves out of engagement with the ferrule shoulder 42 and through the ferrule face 51 to release the lowermost ferrule 15. The upper arm segment 41b engages the next lower ferrule 15 to prevent it from sliding off the dispenser. After the rocker arm segment 41a passes through the bore 51 of the lowermost ferrule 15 to release this ferrule, it is free to move outwardly to engage the internal shoulder 42 on the next ferrule 15 under the urging of the return spring 52.

When the solenoid 46 is deactivated, the spring 47 returns the rod 40 to its lowermost position and the dispenser is in condition to release another ferrule 15.

The invention is not to be limited to the exact arrangement of parts shown in the accompanying drawings or described in this specification as various changes in the details of construction may be resorted to without departing from ths spirit or scope of the invention. Therefore, only insofar as the invention is particularly pointed out in the accompanying claims is the same to be limited.

What is claimed is:

1. A method of placing stud welding throughbored ferrules onto a work surface to receive shear connectors therein comprising the steps of loading the ferrules into a disposable tubular magazine, positioning the tubular magazine adjacent to an elongated dispenser mechanism, said dispenser mechanism including an elongated rod and a releasible stop member adjacent to one end of said rod, locking the stop member in its released position, loading the ferrules in a stack from the magazine onto the elongated rod whereby the throughbores of the ferrules are passed over the rod, discarding the magazine, unlocking the stop member, engaging the lowermost ferrule of the stack with the releasible stop member to hold the stack onto the rod, selectively releasing the stop member to deposit only a single ferrule onto a preselected location on a work piece, and reengaging the stop means with the next lowermost ferrule in said stack to again restrain release of ferrules from the rod.

2. A dispenser for cylindrical articles comprising
(a) two elements relatively movable in a longitudinal direction,
(b) a stack of hollow cylindrical articles carried by one of said elements, each of said articles having an internal shoulder,
(c) a rocker arm engaging the internal shoulder of the forwardmost article in said stack for restraining the said article from leaving the stack when said rocker arm is in a first position,
(d) the other of the relatively movable elements being an actuating rod positioned within the hollow centers of said articles and pivotably connected to the rocker arm for pulling the rocker arm through the center of the articles to a second position to release the lowermost article from said stack, and
(e) means for returning the rocker arm to its first article engaging position.

3. The dispenser of claim 2 including a solenoid for moving the actuator rod.

4. The dispenser of claim 2 wherein the second element is a tube around which the articles to be dispensed are positioned and which surrounds the actuating rod.

5. A dispenser for stud welding ferrules comprising
(a) a hollow tubular body having a dispensing end,
(b) a stem within the tubular body,
(c) a stack of cylindrical stud welding ferrules having their hollow centers aligned in a longitudinal direction positioned within the tubular body with the stem within the centers of the ferrules to center and support the ferrules,
(d) restraining means for engaging the forwardmost article in said stack for restraining the said article from leaving the stack, said restraining means being movable from a position out of the tubular body to a position at least partially within the tubular body to block release of said articles,
(e) a nose cone slidable in a longitudinal direction mounted on the body at the dispensing end, the cone having internal bores of different diameters, including a smaller diameter, sized to move the restraining means into the tubular body to retain the ferrules, and a larger diameter sized to allow said restraining means to move out of the tubular body and release the ferrules from the body,
(f) resilient means urging the cone into ferrule restraining position, and
(g) locking means associated with the cone and the body to fix the restraining means in ferrule dispensing position allowing loading of ferrules into the tubular body through the nose cone.

6. The dispenser of claim 5 wherein the locking means includes a pin and lock slot associated with the tube and cone, whereby the cone is moved toward the tube against the resilient means to fix the pin in the lock slot.

7. A dispenser for cylindrical articles comprising
(a) two elements relatively movable in a longitudinal direction, one of said relatively movable elements being a cylindrical tube and the other element having an internal bore for slidably receiving the end of the tube,
(b) a stack of hollow cylindrical articles positioned within said cylindrical tube with their hollow centers aligned and oriented in the longitudinal direction,
(c) restraining means for engaging the forwardmost article in said stack for restraining the said article from leaving the stack, said restraining means being movable between a position at least partially within the interior of the tube to block release of said articles and a position at least partially within the interior of the bore of the other element for releasing the articles,
(d) means cooperating with the restraining means for releasing the restraint on said forwardmost article and allowing the said article to leave the stack,
(e) the restraining means and the cooperating release means being mounted on the relatively movable elements whereby relative longitudinal movement of said parts releases one of said elements, and
(f) means associated with the two relatively movable elements for locking said elements in the article dispensing mode to allow loading of articles into the tube.

8. The dispenser of claim 7 wherein the locking means includes a pin and slot having a lock portion.

9. The dispenser of claim 7 wherein the cylindrical tube has a tapered opening adjacent to the discharge end thereof and the other element is juxtaposed to the large end of said opening, the restraining means being a ball positioned in said tapered opening, the said other element having bores of different internal diameters, the smallest diameter slidingly engaging the exterior surface of the tube and urging the ball into the interior of the tube to block release of the articles in the tube and a larger diameter bore allowing entry of the balls to release the articles in the tube for dispensing.

10. The dispenser of claim 9 including resilient means surrounding the tube and connecting the two relatively movable elements.

11. The dispenser of claim 9 including means closing the other end of the tube and an internal stem in the tube and positioned within the hollow centers of said stacked articles for centering and supporting said articles within the tube.

12. The dispenser of claim 10 including a collar longitudinally adjustable along the tube and means for locking the collar to the tube, the collar anchoring one end of the resilient means.

* * * * *